United States Patent
Coldicott et al.

(10) Patent No.: US 8,726,236 B2
(45) Date of Patent: May 13, 2014

(54) DETERMINING CONTEXT SPECIFIC CONTENT

(75) Inventors: Peter Alan Coldicott, Austin, TX (US); Eoin Lane, Littleton, MA (US); Magda Mahmoud Mourad, Hawthorne, NY (US)

(73) Assignee: International Business Machines Corporation, Armonk, NY (US)

( * ) Notice: Subject to any disclaimer, the term of this patent is extended or adjusted under 35 U.S.C. 154(b) by 1117 days.

(21) Appl. No.: 12/605,562

(22) Filed: Oct. 26, 2009

(65) Prior Publication Data

US 2011/0099536 A1   Apr. 28, 2011

(51) Int. Cl.
*G06F 9/44* (2006.01)
*G06F 9/45* (2006.01)
*G06F 17/30* (2006.01)

(52) U.S. Cl.
USPC ........... 717/120; 717/123; 717/141; 707/661; 707/802

(58) Field of Classification Search
None
See application file for complete search history.

(56) References Cited

U.S. PATENT DOCUMENTS

| | | | |
|---|---|---|---|
| 6,256,773 B1 | 7/2001 | Bowman-Amuah | |
| 6,539,396 B1 | 3/2003 | Bowman-Amuah | |
| 6,658,644 B1 | 12/2003 | Bishop et al. | |
| 6,799,174 B2 | 9/2004 | Chipman et al. | |
| 7,080,064 B2 | 7/2006 | Sundaresan | |
| 7,099,859 B2 | 8/2006 | Sundaresan | |
| 7,103,871 B1 | 9/2006 | Kirkpatrick et al. | |
| 7,225,241 B2 | 5/2007 | Yada | |
| 7,318,055 B2 | 1/2008 | Britton et al. | |
| 7,366,706 B2 | 4/2008 | Chang et al. | |
| 7,412,457 B2 | 8/2008 | Saracco et al. | |
| 7,483,973 B2 | 1/2009 | An et al. | |
| 7,526,501 B2 | 4/2009 | Albahari et al. | |
| 7,546,295 B2 | 6/2009 | Brave et al. | |
| 7,792,868 B2 * | 9/2010 | Finkelstein et al. | 707/798 |
| 7,890,517 B2 | 2/2011 | Angelo et al. | |
| 7,979,840 B2 | 7/2011 | Zhang et al. | |
| 8,001,129 B2 * | 8/2011 | Arumainayagam et al. | 707/749 |
| 8,010,947 B2 * | 8/2011 | Carbone et al. | 717/121 |
| 2002/0069102 A1 | 6/2002 | Vellante et al. | |
| 2002/0073106 A1 | 6/2002 | Parker et al. | |
| 2002/0194053 A1 | 12/2002 | Barrett et al. | |
| 2003/0009740 A1 | 1/2003 | Lan | |
| 2003/0233339 A1 * | 12/2003 | Downs | 707/1 |
| 2003/0233631 A1 | 12/2003 | Curry et al. | |

(Continued)

FOREIGN PATENT DOCUMENTS

WO   2007113164   10/2007

OTHER PUBLICATIONS

U.S. Appl. No. 12/605,635, filed Oct. 26, 2009, Coldicott et al.
U.S. Appl. No. 12/605,660, filed Oct. 26, 2009, Coldicott et al.

(Continued)

*Primary Examiner* — Michael Sun
(74) *Attorney, Agent, or Firm* — Patents on Demand P.A.; Brian K. Buchheit; Scott M. Garrett

(57) ABSTRACT

In one illustrative embodiment, a computer-implemented method for identifying program components, generates, by a processor unit, associations between the program components stored in a computer usable storage medium to create a first set of relationships, and assigns, by the processor unit, a probability to each relationship in the first set of relationships to create a second set of relationships, wherein the probability indicates a strength of the associations between the program components.

17 Claims, 6 Drawing Sheets

(56) References Cited

U.S. PATENT DOCUMENTS

| | | |
|---|---|---|
| 2004/0158815 A1* | 8/2004 | Potgieter .................. 717/120 |
| 2004/0172612 A1 | 9/2004 | Kasravi et al. |
| 2004/0193476 A1 | 9/2004 | Aerdts |
| 2005/0050311 A1 | 3/2005 | Joseph et al. |
| 2005/0050549 A1 | 3/2005 | Joseph et al. |
| 2005/0138113 A1 | 6/2005 | Brendle et al. |
| 2005/0166178 A1 | 7/2005 | Masticola et al. |
| 2005/0278202 A1 | 12/2005 | Broomhall et al. |
| 2006/0015489 A1 | 1/2006 | Probst et al. |
| 2006/0047810 A1 | 3/2006 | Herzog et al. |
| 2006/0070083 A1 | 3/2006 | Brunswig et al. |
| 2006/0174222 A1 | 8/2006 | Thonse et al. |
| 2006/0229896 A1 | 10/2006 | Rosen et al. |
| 2006/0236307 A1* | 10/2006 | Debruin et al. ............ 717/117 |
| 2006/0241931 A1 | 10/2006 | Abu el Ata et al. |
| 2007/0073663 A1 | 3/2007 | McVeigh et al. |
| 2007/0094219 A1* | 4/2007 | Kipersztok ................. 706/52 |
| 2007/0112712 A1 | 5/2007 | Flinn et al. |
| 2007/0239768 A1 | 10/2007 | Quinn-Jacobs |
| 2007/0261027 A1 | 11/2007 | Dhanakshirur et al. |
| 2007/0271277 A1 | 11/2007 | Ivan et al. |
| 2008/0059630 A1 | 3/2008 | Sattler et al. |
| 2008/0114700 A1 | 5/2008 | Moore et al. |
| 2008/0126397 A1 | 5/2008 | Alexander et al. |
| 2008/0127047 A1 | 5/2008 | Zhang et al. |
| 2008/0133558 A1 | 6/2008 | Carlson et al. |
| 2008/0134137 A1 | 6/2008 | Petersen |
| 2008/0178147 A1 | 7/2008 | Meliksetian et al. |
| 2008/0215358 A1 | 9/2008 | Goldszmidt et al. |
| 2008/0215400 A1 | 9/2008 | Ban et al. |
| 2008/0229195 A1 | 9/2008 | Brauel et al. |
| 2008/0235664 A1* | 9/2008 | Carbone et al. ............ 717/120 |
| 2008/0270372 A1 | 10/2008 | Hsu et al. |
| 2008/0288944 A1 | 11/2008 | Coqueret et al. |
| 2009/0064087 A1 | 3/2009 | Isom |
| 2009/0077043 A1 | 3/2009 | Chang et al. |
| 2009/0089078 A1 | 4/2009 | Bursey |
| 2009/0109225 A1 | 4/2009 | Srivastava et al. |
| 2009/0112908 A1 | 4/2009 | Wintel et al. |
| 2009/0132211 A1 | 5/2009 | Lane et al. |
| 2009/0138293 A1 | 5/2009 | Lane et al. |
| 2009/0158237 A1 | 6/2009 | Zhang et al. |
| 2009/0182610 A1 | 7/2009 | Palanisamy et al. |
| 2009/0182750 A1 | 7/2009 | Keyes et al. |
| 2009/0193057 A1 | 7/2009 | Maes |
| 2009/0193432 A1 | 7/2009 | McKegney et al. |
| 2009/0201917 A1 | 8/2009 | Maes et al. |
| 2009/0204467 A1 | 8/2009 | Rubio et al. |
| 2009/0210390 A1 | 8/2009 | Lane |
| 2009/0228425 A1* | 9/2009 | Goraya ..................... 706/59 |
| 2009/0254876 A1* | 10/2009 | Kuriakose et al. .......... 717/105 |
| 2010/0082387 A1 | 4/2010 | Cao et al. |
| 2010/0106656 A1 | 4/2010 | Sheth et al. |
| 2010/0161629 A1 | 6/2010 | Palanisamy et al. |
| 2010/0312731 A1* | 12/2010 | Knoblauch ................. 706/18 |
| 2011/0035391 A1 | 2/2011 | Werner et al. |
| 2011/0153292 A1 | 6/2011 | Lane et al. |
| 2011/0153293 A1 | 6/2011 | Coldicott et al. |
| 2011/0153608 A1 | 6/2011 | Lane et al. |
| 2011/0153610 A1 | 6/2011 | Carrato et al. |
| 2011/0153767 A1 | 6/2011 | Coldicott et al. |
| 2011/0202326 A1* | 8/2011 | Salemann ................... 703/6 |
| 2011/0238610 A1 | 9/2011 | Lee et al. |
| 2012/0023042 A1* | 1/2012 | Das ......................... 706/12 |

OTHER PUBLICATIONS

Building SOA applications with reusable assets, Part 1: Reusable assets, recipes, and patterns, http://www.microsofttranslator.com/BV.aspx?ref=IE8Activity&a=http%3A%2F%2Fwww.ibm.com%2Fdeveloperworks%2Fcn%2Fwebservices%2Fws-soa-reuse1%2, Aug. 28, 2006.

Building SOA applications with reusable assets, Part 2: SOA recipe reference example, http://www.microsofttranslator.com/BV.aspx?ref=IE8Activity&a=http%3A%2F%2Fwww.ibm.com%2Fdeveloperworks%2Fcn%2Fwebservices%2Fws-soa-reuse2%2F, Aug. 28, 2006.

Building SOA applications with reusable assets, Part 3: WS response templete pattern, http://www.microsofttranslator.com/BV.aspx?ref=IE8Activity&a=http%3A%2F%2Fwww.ibm.com%2Fdeveloperworks%2Fcn%2Fwebservices%2Fws-soa-reuse3%2F, Mar. 29, 2007.

Jin et al., "Automated Requirements Elicitation: Combining a Model-Driven Approach with Concept Reuse", International Journal of Software Engineering and Knowledge Engineering, vol. 13, No. 1, 2003, pp. 53-82.

Justin Kelleher, "A Reusable Traceability Framework Using Patterns", University of Cape Town, ACM Digital Library, 2005, pp. 50-55.

Sharples et al., "The Design and Implementation of a Mobile Learning Resource", Educational Technology Research Group, University of Birmingham, ACM Digital Library, 2002, pp. 1-23.

Min Luo, "Tutorial 1: Common Business Components and Services Toward More Agile and Flexible Industry Solutions and Assets", 2008 IEEE Congress on Services Part II, pp. 11-12.

Ying Huang et al., "A Stochastic Service Composition Model for Business Integration", Proceeds of the International Conference on Next Generation Web Services Practices, 2005 IEEE Computer Society, pp. 1-8.

Pham et al., "Analysis of Visualisation Requirements for Fuzzy Systems", 2003 ACM, pp. 181-187.

* cited by examiner

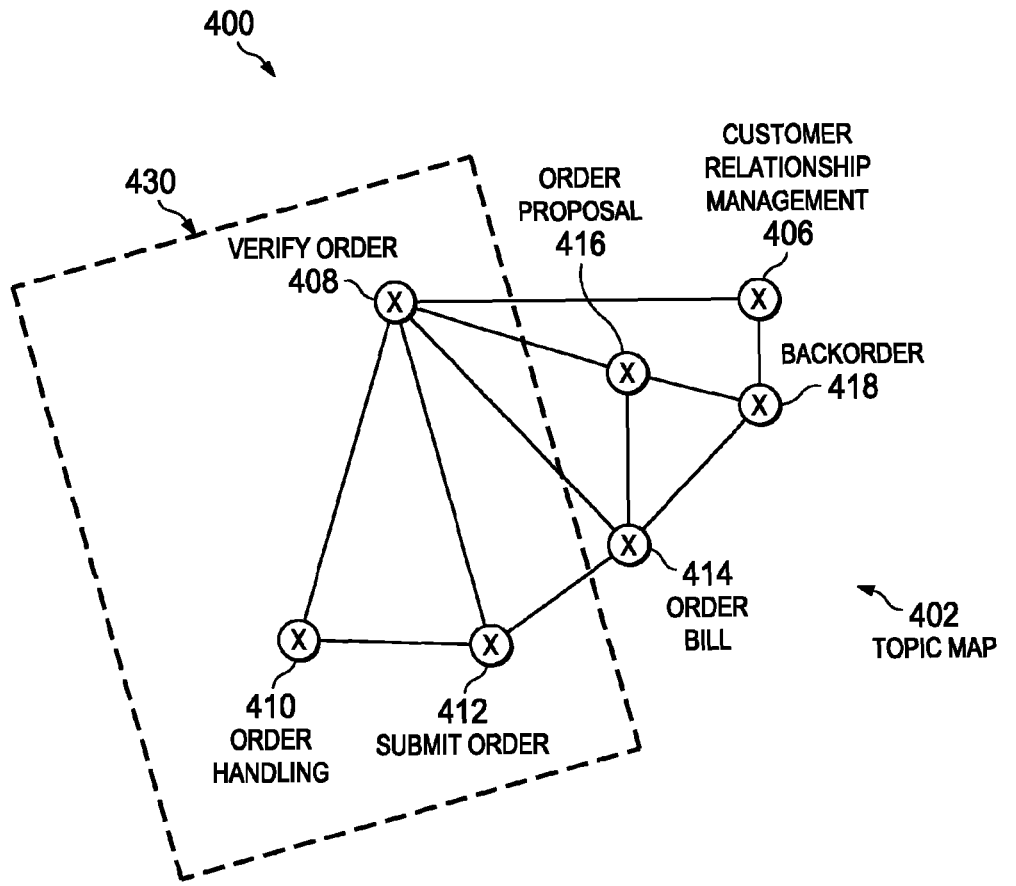
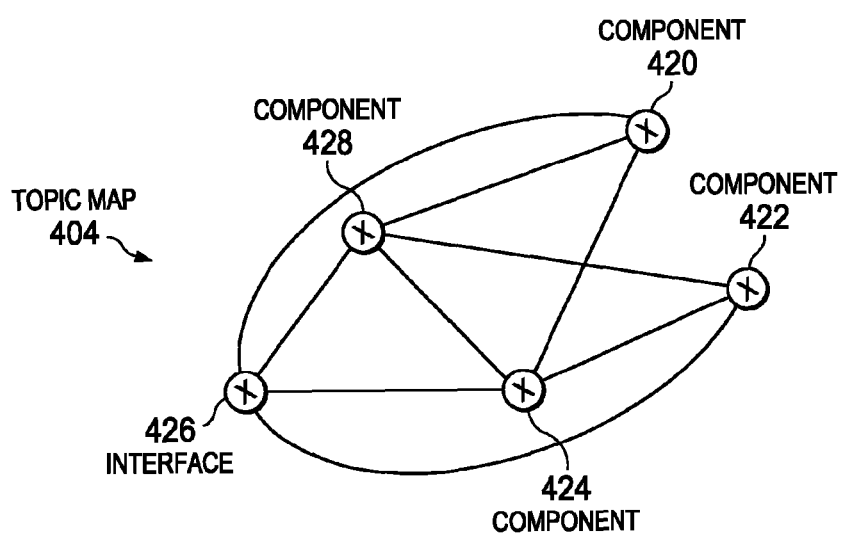
FIG. 4

WEIGHTED CORRESPONDENCE MAP 600

| PROBABILITY | DOMAIN 1 | DOMAIN 2 | DOMAIN... | ... | DOMAIN N |
|---|---|---|---|---|---|
| 20 | 408 | 420 | 618 | ... | |
| 80 616 | 412 | 426 | | ... | |
| 95 | 414 | 428 | | ... | |
| ⋮ | ⋮ | ⋮ | ⋮ | ⋮ | ⋮ |
| | | | | ... | |

602 → PROBABILITY, 604 → DOMAIN 1, 606 → DOMAIN 2, 608 → DOMAIN N
610 → 20, 612 → 80, 614 → 95

- 702 START
- 704: GENERATING BY PROCESSOR UNIT ASSOCIATIONS BETWEEN PROGRAM COMPONENTS STORED IN A COMPUTER USABLE MEMORY TO CREATE A FIRST SET OF RELATIONSHIPS
- 706: ASSIGNING A PROBABILITY TO EACH RELATIONSHIP IN THE FIRST SET OF RELATIONSHIPS TO CREATE A SECOND SET OF RELATIONSHIPS
- 708 END

DETERMINING CONTEXT SPECIFIC CONTENT

BACKGROUND

1. Field

The disclosure relates generally to determining context related content and, more specifically, to a method, apparatus and program product for determining program components.

2. Description of the Related Art

Industry trends show that enterprises are adopting model-driven development, resulting in the emergence of products offering analysis and design frameworks for model-driven development. These frameworks are primarily based on industry standards such as Unified Modeling Language (UML), Meta-Object Facility (MOF), and Common Warehouse Meta-model (CWM) available from the Object Management Group (OMG.org), which target vertical industries, such as insurance and banking. Tools are also available to provide needed infrastructure, with added tools and services to capture, maintain, and manage standard-based complex models and make the models available to an entire enterprise for accessibility, asset re-use and customization of the specific enterprise projects.

A problem with asset re-use in software project development is that without adequately delimiting the scope of a search, a meaningful sub-set of reusable artifacts from the entire asset base may be difficult or impossible to obtain. A software developer or a consultant on an engagement works in a specific context. The context is provided by the scope of the project and by the functional and non-functional requirements for that project. The scope of a project may be determined by the industry such as insurance, or finance, and by the selected architectural style, such as service-oriented architecture (SOA), client/server, or distributed, as well as the specific business functionality to be delivered.

A software developer would like to be directed only to the content relevant to the particular context. For example, in an insurance project, a functional requirement of creating a claims system can be mapped to reusable software assets, such as an insurance Unified Modeling Language (UML) model previously designed for a claims system. A nonfunctional requirement, such as a transactional claims process, can map to another type of reusable software asset, such as a software pattern to help make consistent architectural decisions. There has typically been no reasonable mechanism to determine the relevant content required for developing particular software in a consistent manner, therefore allowing for better consumption of reusable assets, such as models and patterns.

SUMMARY

According to one illustrative embodiment, a computer-implemented method identifies program components. The computer-implemented method generates, by a processor unit, associations between the program components stored in a computer usable memory to create a first set of relationships, and assigns, by the processor unit, a probability to each relationship in the first set of relationships to create a second set of relationships, wherein the probability indicates a strength of the associations between the program components.

According to another illustrative embodiment, an apparatus for identifying program components comprises a communications fabric, a memory connected to the communications fabric; the memory having computer executable program code stored therein, a communications unit connected to the communications fabric, and a processor unit connected to the communications fabric. The processor unit executes the computer executable program code to direct the apparatus to receive a request, through the communications fabric by the processor unit, from a client to generate associations between program components stored in a computer usable memory to form a first set of relationships, and create a second set of relationships by assigning a probability to each relationship in the first set of relationships, by the processor unit, using Bayesian probability, wherein the probability indicates a strength of the associations between the program components.

According to another illustrative embodiment, a computer-implemented process for identifying program components receives a request, through a communications fabric by a processor unit, from a client to generate associations between program components stored in a computer usable memory to form a first set of relationships, and creates a second set of relationships by assigning a probability to each relationship in the first set of relationships by the processor unit using Bayesian probability, wherein the probability indicates a strength of the associations between the program components.

According to another illustrative embodiment, a computer program product for identifying program components comprises a computer-readable storage medium having computer executable program code stored therein. The computer executable program code comprises computer executable program code for receiving a request, through a communications fabric by a processor unit, from a client to generate associations between program components stored in the computer readable storage medium to form a first set of relationships, and computer executable program code for creating a second set of relationships by assigning a probability to each relationship in the first set of relationships by the processor unit using Bayesian probability, wherein the probability indicates a strength of the associations between the program components.

BRIEF DESCRIPTION OF THE SEVERAL VIEWS OF THE DRAWINGS

FIG. 4 is a graphic representation of topic maps using the asset advisor process of FIG. 3, in accordance with illustrative embodiments;

FIG. 6 is a tabular representation of the weighted correspondence map of FIG. 5, in accordance with illustrative embodiments;

FIG. 7 is a flowchart of a high level process for determining context specific content using the asset advisor process of FIG. 3, in accordance with an illustrative embodiment.

DETAILED DESCRIPTION

Figure 1:
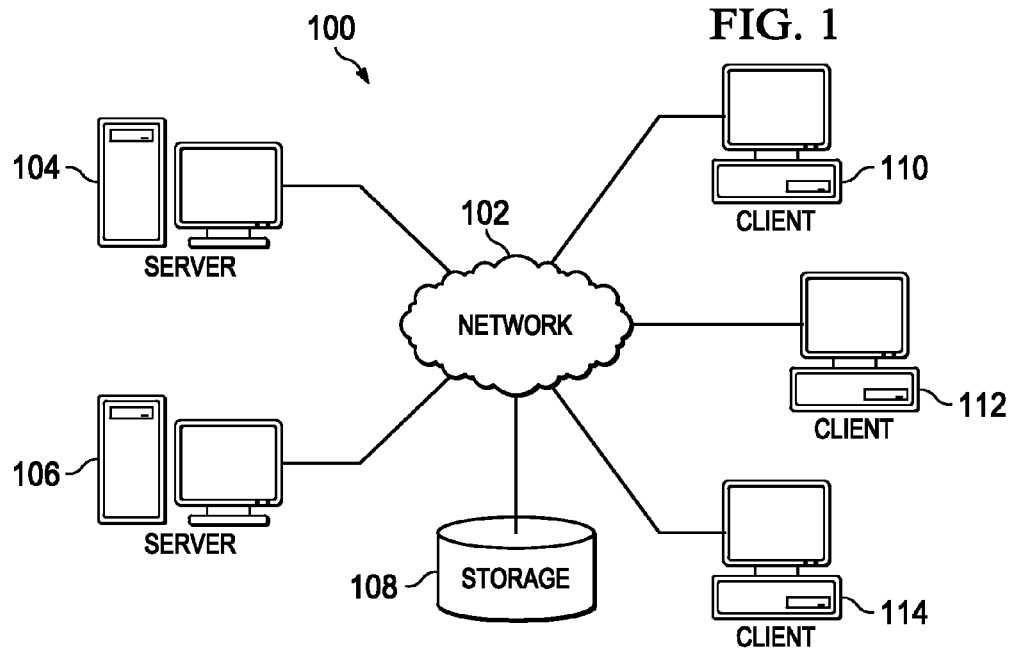
FIG. 1 depicts a pictorial representation of a network of data processing systems in which illustrative embodiments may be implemented.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable devices may be utilized. A computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing.

In the context of this document, a computer readable storage device may be any tangible device that can store a program for use by or in connection with an instruction execution system, apparatus, or device. The term "computer readable storage device" does not mean signal propagation media such as a copper transmission cable, an optical transmission fiber or a wireless transmission media.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 2:
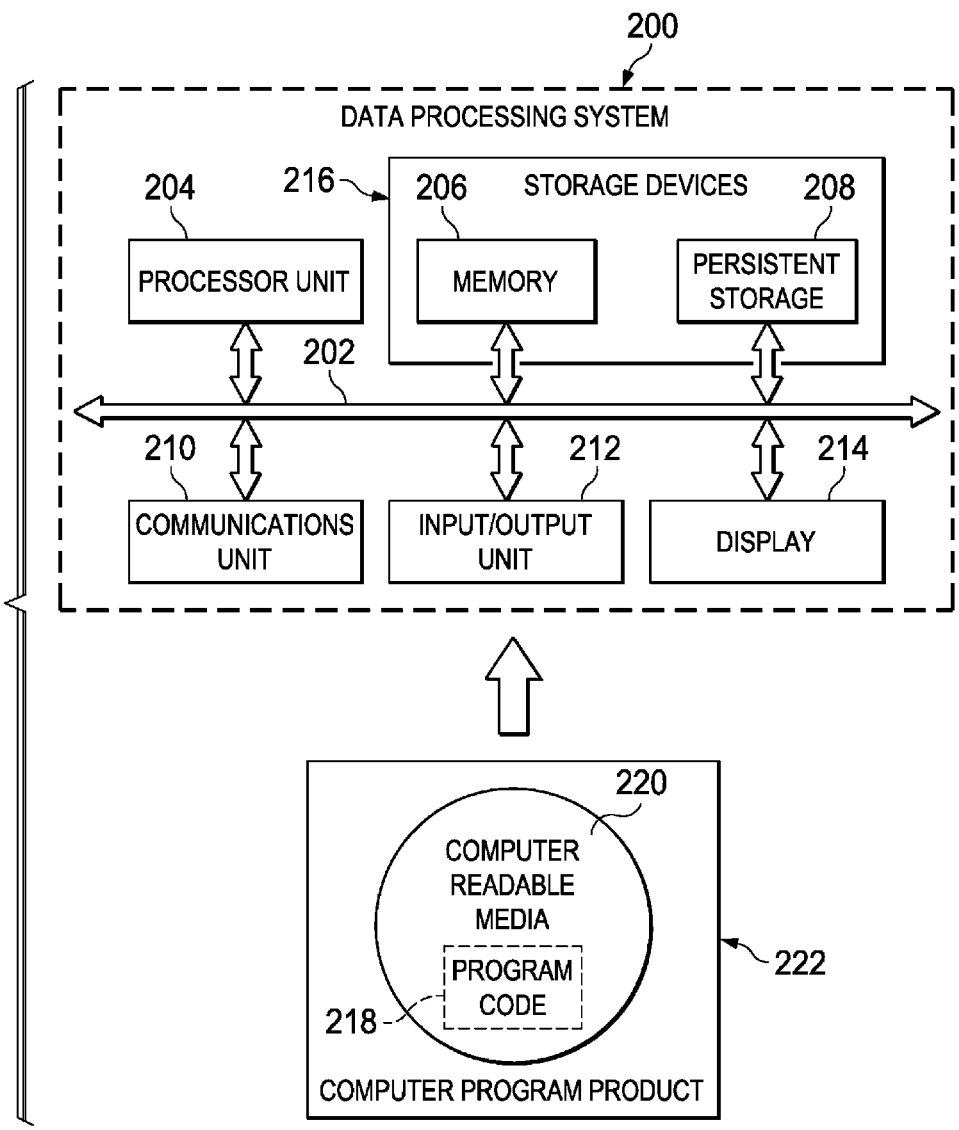
FIG. 2 is a block diagram of a data processing system in which illustrative embodiments may be implemented.

With reference now to the figures and in particular, with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides information, such as boot files, operating system images, and applications to clients 110, 112, and 114. Clients 110, 112, and 114 are clients to server 104 in this example. Network data processing system 100 may include additional servers, clients, and other devices not shown.

Program code located in network data processing system 100 may be stored on a computer recordable storage medium and downloaded to a data processing system or other device for use. For example, program code may be stored on a computer recordable storage medium on server 104 and downloaded to client 110 over network 102 for use on client 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

In one illustrative embodiment using network data processing system 100, context specific content may be obtained by obtaining a set of topic maps, maintained in a repository such as storage 108 or on server 104. A process on server 104 generates associations between respective nodes, (program components) in associated topic maps of the set of topic maps to create a first set of relationships and assigns a probability to each relationship in the set of relationships to create a second set of relationships (weighted correspondence map in this example) in the repository. Client 110 or another requester queries the second set of relationships located on server 104 or in storage 108 through network 102 using predefined criteria or ad hoc criteria. Responsive to a determination that desired assets exist, as a result of the query, server 104 identifies a set of assets, in the form of program components of the example, in compliance with the criteria of the query, and returns the set of assets, (in the form of program components) to client 110.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example without limitation, data, program code in functional form, and/or other suitable information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user. Instructions for the operating system, applications and/or programs may be located in storage devices 216, which are in communication with processor unit 204 through communications fabric 202. In these illustrative examples, the instructions are in a functional form on persistent storage 208. These instructions may be loaded into memory 206 for execution by processor unit 204. The processes of the different embodiments may be performed by processor unit 204 using computer-implemented instructions, which may be located in a memory, such as memory 206.

These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 218 is located in a functional form on computer-readable media 220 that is selectively removable and may be loaded onto or transferred to data processing system 200 for execution by processor unit 204. Program code 218 and computer-readable media 220 form computer program product 222 in these examples. In one example, computer-readable media 220 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable-media 218 also may take the form of a persistent storage, such as a hard drive, a thumb drive, or a flash memory that is connected to data processing system 200. The tangible form of computer-readable media 220 is also referred to as computer-recordable storage media. In some instances, computer-readable media 220 may not be removable.

Alternatively, program code 218 may be transferred to data processing system 200 from computer-readable media 220 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. In some illustrative embodiments, program code 218 may be downloaded over a network to persistent storage 208 from another device or data processing system for use within data processing system 200. For instance, program code stored in a computer-readable storage medium in a server data processing system may be downloaded over a network from the server to data processing system 200. The data processing system providing program code 218 may be a server computer, a client computer, or some other device capable of storing and transmitting program code 218.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. The different embodiments may be implemented using any hardware device or system capable of executing program code. As one example, the data processing system may include organic components integrated with inorganic components and/or may be comprised entirely of organic components excluding a human being. For example, a storage device may be comprised of an organic semiconductor.

As another example, a storage device in data processing system 200 is any hardware apparatus that may store data. Memory 206, persistent storage 208 and computer-readable media 220 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Figure 3:
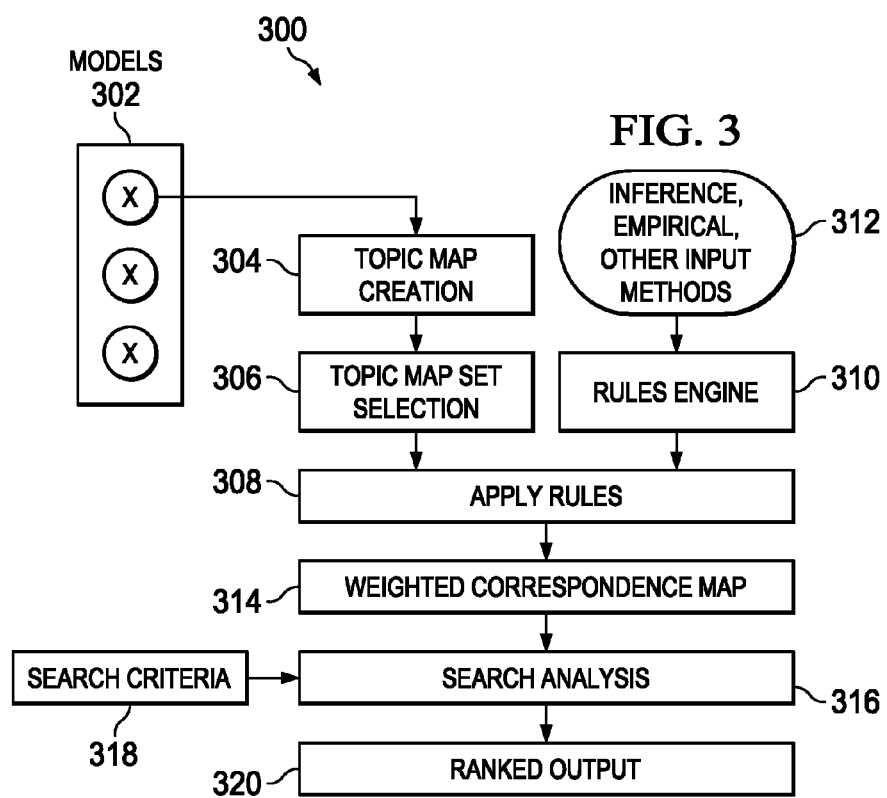
FIG. 3 is a block diagram of components of an asset advisor process in accordance with an illustrative embodiment.

With reference to FIG. 3, a block diagram of components of an asset advisor process in accordance with an illustrative embodiment is presented. Asset advisor process 300 provides a capability of selecting a sub-set of assets from a collection of associated assets to be used within a desired project. The desired project may be a specified software development project, business related process project, such as billing or ordering process, manufacturing process project or similar projects.

Input of models 302 provides the collection of associated assets from which a desired subs-set may be determined. For example, models 302 may be a set of software models defined in a unified modeling language. The models are representative of instance models and reference models. A reference model defines a "what is" scenario, while an instance model defines a "what is to be" or "what is needed" scenario. The "what is" scenario represents an environment that is about to be changed. The "what is to be" scenario represents what the changed environment should look like after changes based on the "what is" scenario have been made.

For each model, a topic map is created using topic map creation 304. Topic map creation 304 provides a capability to define the elements of the model as nodes with adjoining edges to define the relationships between the nodes. Further, the topic map defines an interrelated network of nodes of the input model. For example, in a software application, code is analyzed by a visualization tool that describes and renders the various modules and related dependencies to produce a network diagram of the software application code modules as a set of linked nodes. The network diagram is a representation of a topic map. A topic map thus defines a domain. Topic maps are an example of an illustrative embodiment. Other examples include tree diagram, lists, and data tables in a database, models or other objects suited to definition, manipulation and maintenance in a data processing system.

The nodes in this non-limiting context represent program components; however program components may be many different things. Program components are code, data structures, libraries, parts of applications or programs, text in the form of documentation in human or machine readable form, process diagrams, models or other representations of objects that may have been used in the creation of a previous project. Program components are thus not restricted to software programs.

Topic map set selection 306 is used to determine which topic maps are to be included in the process. For example, when creating a new billing system, topic maps from an old billing system, receivable system, payable system and user interface system may be combined as reference topic maps. The enterprise may have many more topic maps from which to choose. However, there is no need to include maps which are deemed to be less relevant or not relevant to the project at hand. Filtering the topic maps in this manner reduces the processing requirements and time to analyze. The topic maps are used in an illustrative example only. Trees, tables, list and other data structures may be used as well.

Application of a set of rules, as in apply rules 308 using rules engine 310 provides conditional processing and analysis of the topic maps received as input. The rules are typically maintained in a rules database on the data processing system. Rules apply a conditional component and an action component that is fired based on the condition having been met or not met, as the case may be. The rules may be developed using inference information, empirical information or other input methods 312, including developer feedback obtained through an interview process.

For example, a rule may state when receiving payment information to apply a series of edits to verify the input. The action component may then have a specific set of edits to be applied to the input. Deterministic rules typically rely on empirical data. Rules may also be used to apply relationships that are less deterministic and therefore, rely on inference or more subjective reasoning. For example, in a new billing operation to be developed, an input method is needed but reliance on the old interface is not desired. For now, an input method is inferred, as an input method is needed but the input method is not available and cannot therefore be specified. In another example, there may be multiple choices for an asset wherein the assets are interchangeable. The inference is then to use any one of the available assets. In the current example, an asset is a program component.

Identification of associations between program components within one domain with similar components of another domain results in a first set of relationships. The first set of relationships is then further defined with respect to similarity or how well one program component represents the other program component of affinity between the respective program components.

Relationships between assets of the program components may also be determined according to developer provided observation information. For example, a developer may provide a probabilistic recommendation for an asset or set of assets. The topic maps may therefore have relationships between nodes within a map defined according to varying strengths of probability as well as across topic maps, such as weighted correspondence map 314. For example, in development of an order system, a selection of a legacy model provides a reference model for the new order system that is referred to as the instance model. Relationships defined between nodes of the reference model and nodes of the instance model provide a second set of relationships in the form of a weighted correspondence between the nodes. The weights are determined using analysis techniques including Bayesian probability and frequency analysis and a combination of Bayesian probability and frequency analysis methods.

The second set of relationships is therefore applied across domains or topic maps of the example. The second set of relationships defines the strength of the relationship between the program components. For example the strength of a relationship between an input module in a first domain associated an input module in a second domain is strongest when the modules may be used interchangeably having a high degree of compatibility in capability of function. A weak relationship occurs where there is very little relevance between the modules. Strength is indicated numerically by the probability assigned to the set of elements of the relationship. For example, a relationship between program components A and B is rated as a probability of 90 percent indicating a high strength as compared to a probability of 20 percent representing a low strength.

For example, using the previously described input modules, a weak association and therefore low probability would occur when one module provides a static interface compared to the other module that provides an interactive graphical user interface. In this example the capabilities of the two modules differ significantly. The probability assigned to a relationship increases with the strength of the match between the components of the relationship. Strength and probability assigned is therefore directly related to the number of matching attributes of the program components or assets in the relationship. When more context specific content is present or identified between the two modules, the strength of the relationship is higher. In the example of the input methods, context specific content identifies both modules as input methods. When more contexts are applied a better search is performed and therefore a better match may be found. Contexts define the search criteria or set of conditions upon which a match is to be made. Contexts may be considered as attributes of the objects or program components under consideration in a relationship. For example, attributes include the source of the program component, size, programming language, list of features, inputs and outputs, usage and other factors defining the characteristics of the program component. Relationships are not restricted to one to one and can be defined as multiple combinations of program components to define an interrelationship.

Bayesian probability allows a relationship to be defined in the absence of hard data. Frequency analysis on the other hand relies on the empirical evidence to produce the result. A combination of the two methods provides an adaptive method for updating the information learned over time about the relationships between the nodes within a topic map and across topic maps to create weighted correspondence map 314 in the illustrative example.

A mechanism to automate the context to content mapping thereby provides a capability to make more informed decisions based on Bayesian inference and probability. Bayesian inference uses aspects of the scientific method, which involves collecting evidence that is meant to be consistent or inconsistent with a given hypothesis. As evidence accumulates, the degree of belief in a hypothesis ought to change. With enough evidence, the probability that a hypothesis is true should become very high or very low, as the case may be. Using Bayesian inference allows discrimination between conflicting hypotheses according to the strength of the inference so that hypotheses with very high support should be accepted as true and hypothesis with very low support should be rejected as false. Bayesian inference uses a numerical estimate of the degree of belief in a hypothesis before actual evidence has been observed, and calculates a numerical estimate of the degree of belief in the hypothesis after evidence has been observed.

The process is also repeated when additional evidence is obtained. Bayesian inference usually relies on degrees of belief, or subjective probabilities, in the induction process and does not necessarily claim to provide an objective method of induction. Nonetheless, probabilities can have an objective value and therefore, Bayesian inference can provide an objective method of induction.

For example, an enterprise defines all project requirements and stores the requirements in a repository, such as models 302, and uses Bayesian-based services and tools for mapping a functional requirement relative to creating a new claims system onto the most likely assets or program components used previously, wherein the assets being the program components with the highest probability, matching reusable software assets. Assets for example, may include an insurance unified modeling language model previously designed for a claims system. A software engineer may then clearly select by search analysis 316 using search criteria 318 the specific models that closely relate to the project from which the engineer can view assets in ranked output 320. Ranked output 320 provides assets according to search relevance, indicating strength of the match between the program components of the relationship.

Search analysis 316 may be a database query using search criteria 318 specified in a set theory style of input. For example, a select statement may include a table join operation to associate related topic maps including a weighted correspondence map 314 containing the second set of relationships.

The exemplary determination is based on using Bayesian-based inference tools and services. Extension of a service definition for an asset repository containing the program components provides the ability to make more informed decisions based on Bayesian inference and probability. In the example, a query service is used to allocate the best model for an ordering system that matches a given requirement, using a Bayesian inference and search methodology.

With reference to FIG. 4, a graphic representation of topic maps using the asset advisor process of FIG. 3 in accordance with illustrative embodiments is presented. The individual topic maps, such as topic map 402 and topic map 404, are representative of respective domains comprising program components. For example, topic map 402 may be a representation of a portion of a new order process software application. Topic map 404 may be a representation of a legacy software application having components similar to those of an order process software application, or of a previously used order process.

The various nodes within the topic map represent program components or assets of the domain being modeled. Node 406 represents a customer relationship management function in the new order process application. Node 408 represents verify order, node 410 represents order handling, node 412 represents submit order, node 414 represents order bill, node 416 represents order proposal, and node 418 represents backorder. A complex web of interrelated nodes may thus result from the visualization of a complex process or application having a plurality of interrelationships defined. Edges between nodes identify relationships. Nodes may be interrelated in one-to-many relationships or a one-to-one relationship, as needed. Topic map 404 is comprised of component nodes 420, 422, 424 and 428, while node 426 represents an interface.

Topic map 402 represents an instance model, while topic map 404 represents a reference model. An association between topics in topic map 402 and topic map 404 is formed wherein: t a (402) denotes a topic a belonging to topic map 402 and t a (402) has associations with t a'(404), where a'=a, b, c, d . . . ). The assignment statement denotes that topic a belonging to topic map 402 has associations with multiple topics in topic map 404. The multiple assignments define the possible choices for the associations. The desire then is to determine which associations between topic map 402 best match those of topic map 404.

Figure 5:
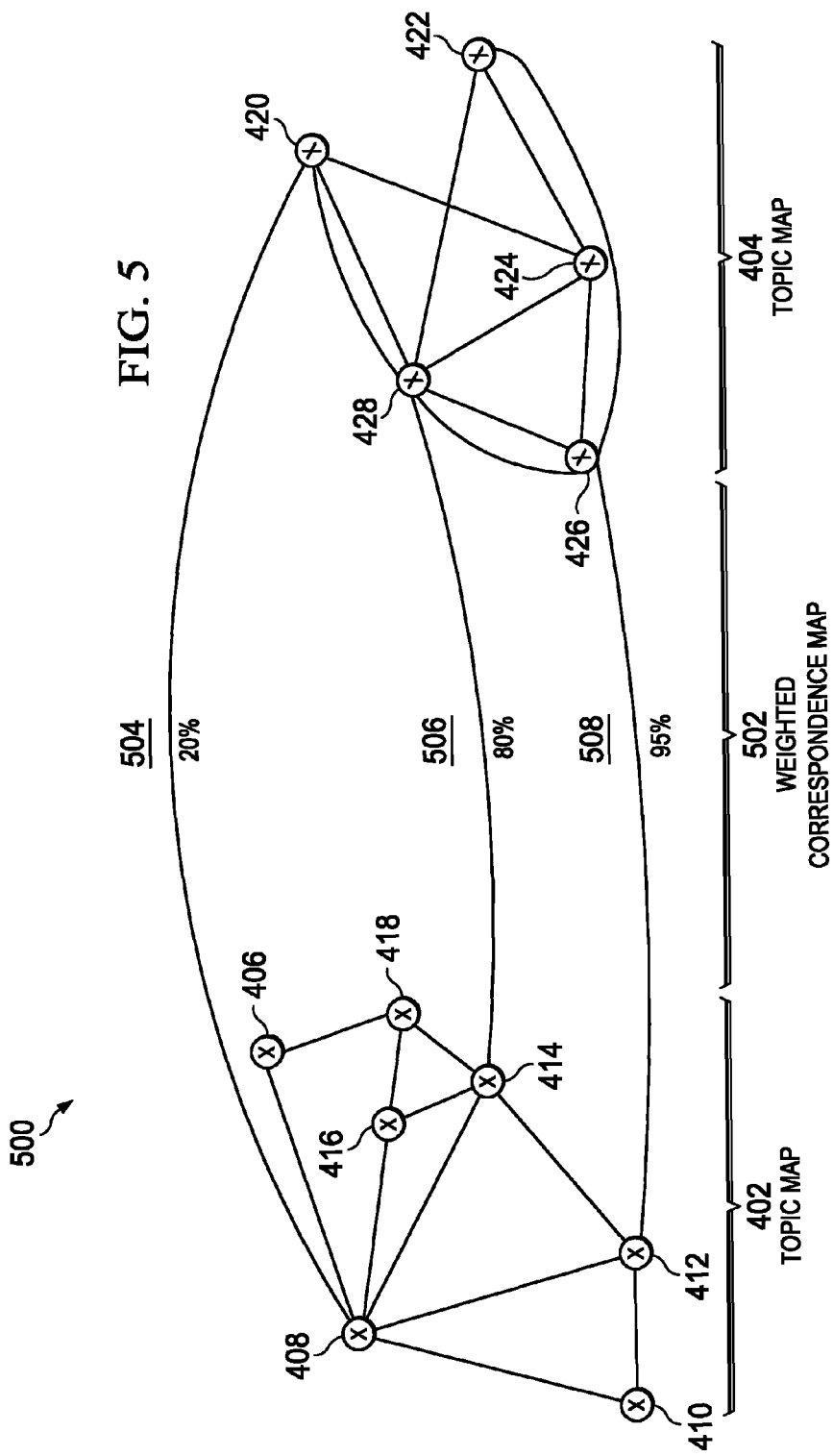
FIG. 5 is a graphic representation of a weighted correspondence map using the asset advisor process of FIG. 3, in accordance with illustrative embodiments.

With reference to FIG. 5, a graphic representation of a weighted correspondence map using the asset advisor process of FIG. 3 in accordance with illustrative embodiments is presented. Weighted correspondence maps are created by weighting the topic choice associations and updating the weights based on an aggregation of user choices. The weighting provides an increased capability to provide relevant guidance to the end user, or requester, about which choice to make. The requester can be another component in a data processing. The requester can programmatically request program components using predefined queries against the weighted correspondence map or second set of relationships. Possible ways of weighting the topic map associations include a frequency analysis and a Bayesian probability analysis, or a combination Bayesian probability and frequency analysis methods. Correspondence system 500 includes weighted correspondence map 502 that expresses the relationship defined between associated nodes of topic map 402 and topic map 404 of FIG. 4.

Experienced software engineers and developers may be interviewed to construct hypotheses about what could be the best matching of the models for the order systems for a given requirement in the current example. The models for order systems are reduced into components as depicted in the graphical representation of nodes and edges of topic maps 402 and 404, and a probability is assigned to each edge connecting the given requirement, under each of the hypotheses, to give a number of probability nodes, one for each hypothesis. When added together, these nodes produce an overall probability graph. The probability attached to each edge is then the probability that the requirement will be built using that node. The probability is illustrated for edges or links 504, 506 and 508. Edge 504 has an assigned probability of 20 percent for a relationship defined between node 408 and node 420. In a similar manner, edge 506 defines a relationship between node 414 and node 428, having a probability of 80 percent. Edge 508 defines a relationship between node 412 and node 426, having a probability of 95 percent.

A second instance of weighted correspondence map 502 can be constructed after the completion of each project with probabilities that represent the probability of successfully finding a node that matches the same requirement. The result of combining the topic map with the previous topic map is a weighted correspondence map which gives the probability of finding the nodes matching the requirement in each node of the topic map if the topic map were to be searched. Weighted correspondence map 502 is the map for search analysis 316 of FIG. 3.

Given a requirement in a new project, weighted correspondence map 502 will systematically be searched in a manner which started with the high probability regions/nodes first down to the low probability regions/nodes last. Each time a map is searched and found to be empty, the probability assignments of the weighted correspondence map is reassessed using Bayes' theorem. If a weighted correspondence map has a probability p of containing the requirement and that the probability of successfully detecting the requirement if the requirement exists is q and if a search yields no result, then, by Bayes' theorem, the revised probability of the requirement being in the square is given by $p'=p(1-q)/((1-p)+p(1-q))$.

Revision of weighted correspondence map 502 is also performed in conjunction with updates to topic map 402 and topic map 404 of FIG. 4, and as a result of updating the topic maps to reflect changes. Updates are typically the result of applying newly obtained empirical evidence to support or change hypotheses associated with probability assignments.

In the example of correspondence system 500, a search for assets related to functions of nodes 408, 412 and 414 yields results associating nodes 420, 426 and 428 respectively. The output of nodes 420, 426 and 428 illustrates a case of one-to-one mapping. In the case of many-to-one mappings, node 408 may be associated with several nodes from topic map 404, from which a selection would be made. Also, in this case the selections would be presented in ranked order by relevance of the association.

In an illustrative example, the maps of FIG. 5 may be implemented as a set of database tables managed by a database management system in a data processing system. Weighted correspondence map 502 may be implemented as a real or virtual resource in the form of a materialized view, virtual view or physical table, as desired. Other methods of managing the data may typically include data structures of a set of arrays, trees or set of vectors describing the relationships.

With reference to FIG. 6, a tabular representation of the weighted correspondence map of FIG. 5 is presented in accordance with illustrative embodiments. Weighted correspondence map 600 depicts associations between program components in a first and second domain. The associations include probabilities.

In the header row, column 602 is labeled probability indicating the column of values represents the probability assigned to the relationship among the domains identified in the remaining column elements of domain 1 604, domain 2 606 and domain N 608. The column between domain 2 606 and domain N 608 indicates a plurality of columns representing domains, each similar to those just described.

Probability 610 represents the strength of an association between element 616 of domain 1 604 and element 618 of domain 2 606. Element 616 has a value of 408 indicating a node 408 of topic map 402 of FIG. 4. Element 618 has a value of 420 indicating a node 420 of topic map 404 of FIG. 4. Probability 612 and probability 614 represent respective associations for the remaining node combinations shown.

The tabular representation may represent a real table join operation in a database implementation or a virtual table such as a pivot table or materialized view. In other implementations the information can be represented as a set of vectors or a simple array of values as well.

With reference to FIG. 7, a flowchart of a high level process for determining context specific content using the asset advisor process of FIG. 3 in accordance with an illustrative embodiment is presented. Process 700 is a high level example of an embodiment of asset advisor process 300 of FIG. 3 to identify program components.

Process 700 starts (step 702) and begins generating by a processor unit, associations between program components stored in a computer usable memory to create a first set of relationships (step 704). The program components may be any assets suitable for reuse, but in the example discussed are typically program components related to software development projects, wherein the components may be portions of programs or applications, subroutines, objects, source or compiled code and even textual information such as manuals in machine readable form.

Assigning a probability to each relationship in the set of first relationships to create a second set of relationships is then performed (step 706) with process 700 terminating thereafter (step 708). The second set of relationships has probabilities assigned to each relationship defined in step 704. For example, the assignment of probabilities defines the examples of weighted correspondence map 500 of FIG. 5 or weighted correspondence map 600 of FIG. 6. The probability indicates the strength of the association between the program component combinations. For example, probability 610 indicates a relationship between components that is not as strong as probability 614 of FIG. 6.

Figure 8:
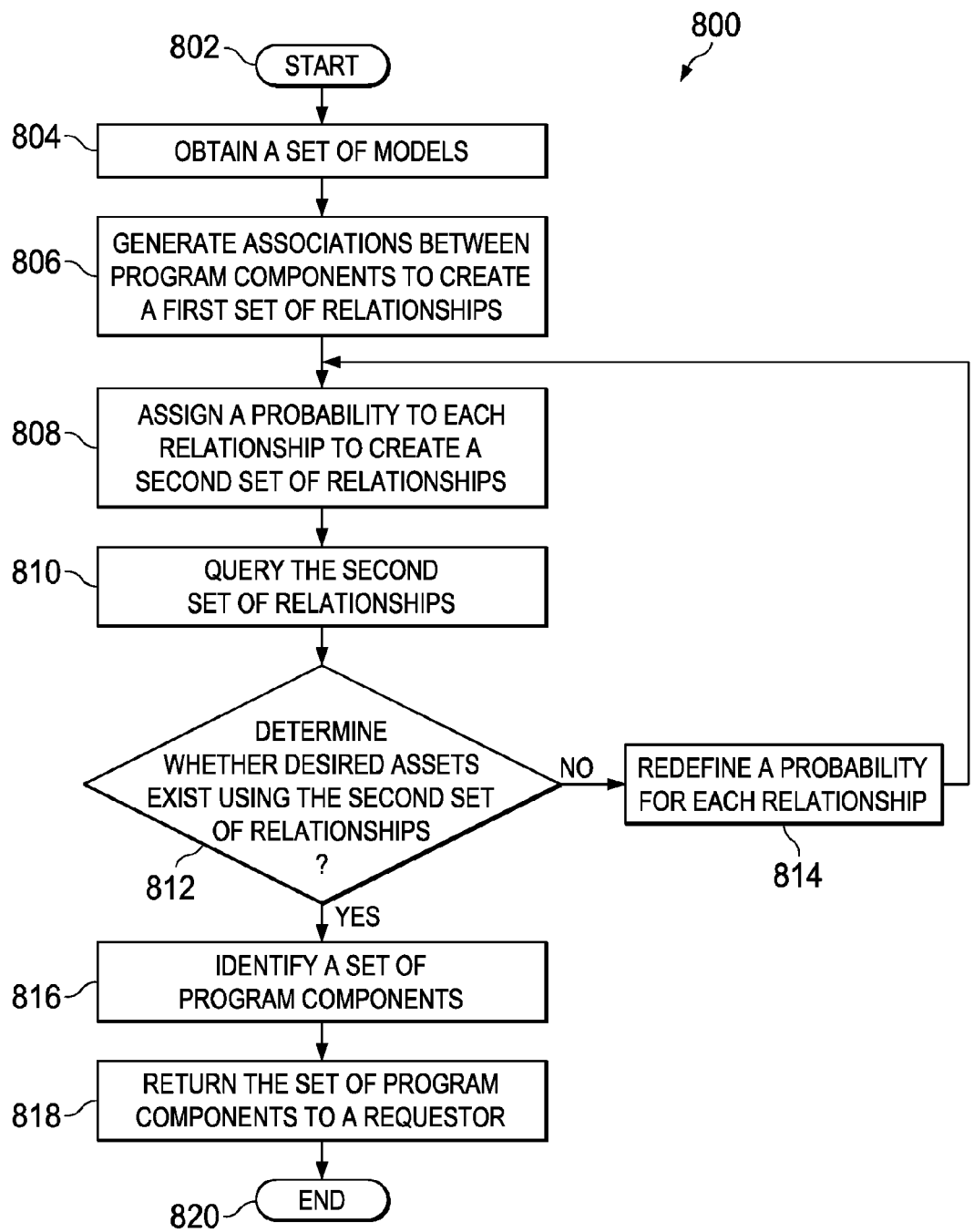
FIG. 8 is a flowchart of a process for determining context specific content using the asset advisor process of FIG. 3, in accordance with an illustrative embodiment.

With reference to FIG. 8, a flowchart of a process for determining context specific content using the asset advisor process of FIG. 3 in accordance with an illustrative embodiment is presented. Process 800 is a more detailed example of an embodiment of asset advisor process 300 of FIG. 3 to identify program components.

Process 800 begins (step 802) and obtains a set of models (step 804). Topic maps may be readily available or require creation from various available models. In one example, unified modeling language models provide the necessary input from which topic maps may be created. In another example, other resources such as component relationship diagrams may be used, wherein the components represent modules of the software project being developed and previously developed. Therefore, obtaining a set of topic maps implies using the maps that exist or creating maps from model data.

Process 800 generates associations between nodes or program components in associated topic maps to create a first set of relationships (step 806). A plurality of topic maps may be associated to provide instance information and reference information combinations. For example, topic maps representing components of billing, payment and maintenance systems provide a reference for a new billing system under development. Assets in the topic maps of the reference systems are associated by implied or explicit relationships to desired assets of the instance system. The relationships are thus defined between the domains of the reference systems and the instance system. In the example, associations are defined between program components of the two domains.

Process 800 assigns a probability to each relationship to create a second set of relationships (step 808). The second set of relationships may be a weighted correspondence map in an example. Assignment of probabilities may be performed based on evidence, inference or other input methods, such as interviewing project personnel. Bayesian methods allow for the use of inferential assignment of probabilities. This form of assignment provides a capability to address missing information. The Bayesian analysis and assignment of probabilities provides information on which to base a selection in the absence of other information. The weighted probability map is yet another domain, typically a subset of the domains for which the associations are defined, in which association probabilities are assigned.

Query the second set of relationships (step 810) is performed to find desired assets, in this example the program components. The query may be a database query using database implementation of the topic maps and weighted correspondence map. In other implementations, a simple table lookup, list or tree traversal, array index analysis or vector-based methods and data structures can be used to manage and resolve relationships. A weighted correspondence table is used because the map represents the aggregation of desired available information having assigned probabilities of assets. In this example, assets or program components represent nodes in the map.

A determination is made as to whether the desired assets exist using the second set of relationships (step 812). If an asset exists, as a result of the query, a "yes" response is obtained. If no asset exists for a given query, a "no" result is obtained. When a "no" is obtained in step 812, process 800 redefines a probability for each relationship in a pair of topic maps (step 814). As a result of redefining a probability, process 800 returns to step 808 in which a revised second set of relationships or weighted correspondence map is now created.

When a "yes" is obtained in step 812, identify a set of program components is performed (step 816). The query results from step 810 are collected as a set of assets or program components. The set of assets is one or more assets resulting from the previously submitted query operation. Assets are typically returned in a rank order of relevance based on the probability that the result matches the target assets. Other ordering may be used as desired. Process 800 returns the set of program components to a requester (step 818) and terminates thereafter (step 820). The requester may be a user or other programmatic component capable of submitting and directing queries and receiving responses.

One or more of the illustrative embodiment illustrates a computer-implemented method which determines context specific content of program components by obtaining a set of models, maintained in a repository on a computer, generates associations between program components to create a first set of relationships and assigns a probability to each relationship in the first set of relationships to create a second set of relationships in the repository. The computer-implemented method further queries the second set of relationships, responsive to a determination that desired assets exist, identifies a set of program components, and returns the set of program components to a requester on the computer.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer-implemented method for identifying program components in nodes of a topic map, the computer-implemented method comprising:
   generating, by a processor unit, associations based on the topic map between the program components stored in a computer readable storage device to create a first set of relationships;
   generating, by the processor unit, using a Bayesian inference and accumulated evidence of the Bayesian inference, respective probabilities to the relationships in the first set of relationships to create a second set of relationships, wherein the probabilities indicate respective strengths of the associations between the program components,
   responsive to a request from a requestor for a set of related program components, the processor unit:
   (a) determining, using the second set of relationships, which of the program components stored in the computer readable storage device have associations with greater than a predetermined level of strength; and
   (b) identifying to the requestor the program components stored in the computer readable storage device that have associations with greater than the predetermined level of strength.

2. The computer-implemented method of claim 1, wherein the first set of relationships are relationships between program components in a first domain and in a second domain of enterprise software, wherein the program components include code, data structures, libraries, parts of programs, process diagrams, software models, or combinations thereof.

3. The computer-implemented method of claim 1, wherein the probability is related to an amount of a context specific content identified by the associations between the program components.

4. The computer-implemented method of claim 1, wherein the step of determining whether the set of program components exists further comprises: querying the second set of relationships.

5. The computer-implemented method of claim 1, wherein the step of creating the second set of relationships further comprises:
   obtaining a set of models, wherein each model in the set of models is specified in a universal modeling language and is representative of a topic domain;
   creating a set of topic maps, wherein each topic map represents a set of nodes within each topic domain, wherein each node represents a program component; and
   selecting a sub-set of topic maps from the first set of relationships, wherein each topic map in the sub-set of topic maps represents one of a portion of the topic domain.

6. The computer-implemented method of claim 1, wherein responsive to a determination that the set of program components does not exist comprises:
   redefining the probability for the each relationship in the second set of relationships, wherein redefining the probability uses a Bayesian theorem to generate the probability.

7. The computer-implemented method of claim 1 further comprises:
   responsive to a determination that the set of program components exists, ranking the program components in the set of program components by probability.

8. The computer-implemented method of claim 4, wherein the step of querying the second set of relationships uses predefined criteria.

9. A computer-implemented process for identifying program components, the computer-implemented process comprising:
   receiving a request, through a communications network by a processor unit, from a client to generate associations between program components stored in a computer readable storage device to form a first set of relationships;
   the processing unit creating a second set of relationships by generating, using a Bayesian inference to compute a set of probabilities of a set of hypotheses using accumulated evidence, respective probabilities to the relationships in the first set of relationships to create a second set of relationships, wherein the probabilities indicate respective strengths of the associations between the program components; and
   the processing unit providing to the client in an electronic form the second set of relationships and the probabilities of the respective relationships in the second set.

10. The computer-implemented process of claim 9, wherein the step of creating further comprises:
   the processing unit obtaining a set of models, wherein each model in the set of models is specified in a universal modeling language and is representative of a topic domain;
   the processing unit creating a set of topic maps, wherein each topic map represents a set of nodes within each topic domain, wherein each node represents a program component; and
   the processing unit selecting a sub-set of topic maps from the first set of relationships, wherein each topic map in the sub-set of topic maps represents one of a portion of the topic domain and the topic domain.

11. The computer-implemented process of claim 9, further comprising:
   the processing unit providing an interface to the client to query the second set of relationships.

12. An apparatus for identifying program components, the apparatus comprising:
   a communications network;
   a computer-readable storage device connected to the communications network, the storage device having computer executable program code stored therein;
   a communications unit connected to the communications network
   a processor unit connected to the communications network, wherein the processor unit executes the computer executable program code to:
   receive a request, through the communications network by the processor unit, from a client to generate associations between the program components stored in a computer readable storage device to form a first set of relationships;
   create a second set of relationships by assigning a probability to each relationship in the first set of relationships by the processor unit using Bayesian inference to compute a set of probabilities of a set of hypotheses using accumulated evidence, wherein the probability indicates a strength of the associations between the program components; and
   provide to the client in an electronic form the second set of relationships and the probabilities of the respective relationships in the second set.

13. The apparatus of claim 12, wherein the processor unit further executes the computer executable program code to:
   obtain a set of models, wherein each model in the set of models is specified in a universal modeling language and is representative of a topic domain;
   create a set of topic maps, wherein each topic map represents a set of nodes within each topic domain, wherein each node represents a program component; and
   select a sub-set of topic maps from the first set of relationships, wherein each topic map in the sub-set of topic maps represents one of a portion of the topic domain and the topic domain.

14. The apparatus of claim 12, wherein the processor unit further executes the computer executable program code:
   responsive to receiving a request from a requester for a set of program components, determine using the second set of relationships, whether the set of program components exist; and
   responsive to a determination that the set of program components exists, return the set of program components to the requester, wherein one of the set of program components and identifiers of the program components in the set of components is returned.

15. A computer program product for identifying program components, the computer program product comprising:
   a computer-readable storage device having computer executable program code stored therein, the computer executable program code comprising:

computer executable program code for receiving a request, through a communications network by a processor unit, from a client to generate associations between program components stored in the computer readable storage device to form a first set of relationships;

computer executable program code for creating a second set of relationships by generating, using a Bayesian inference to compute a set of probabilities of a set of hypotheses using accumulated evidence, respective probabilities to the relationships in the first set of relationships to create a second set of relationships, wherein the probabilities indicate respective strengths of the associations between the program components; and computer executable program code for providing a response for the request to the client, wherein creating the second set of relationships is necessary to produce the response.

16. The computer program product of claim 15, further comprising:

computer executable program code for obtaining a set of models, wherein each model in the set of models is specified in a universal modeling language and is representative of a topic domain;

computer executable program code for creating a set of topic maps, wherein each topic map represents a set of nodes within each topic domain, wherein each node represents a program component; and computer executable program code for selecting a sub-set of topic maps from the first set of relationships, wherein each topic map in the sub-set of topic maps represents one of a portion of the topic domain and the topic domain.

17. The computer program product of claim 15, further comprising:

computer executable program code responsive to receiving a request from a requester for a set of program components, for determining, using the second set of relationships, whether the set of program components exist; and computer executable program code responsive to a determination that the set of program components exists, for returning the set of program components to the requester, wherein one of the set of program components and identifiers of the program components in the set of components is returned.

* * * * *